(12) United States Patent
Bittner

(10) Patent No.: US 7,787,601 B2
(45) Date of Patent: Aug. 31, 2010

(54) SYSTEM AND METHOD FOR IVR SIGNATURE DETECTION AND EVENT MANAGEMENT

(75) Inventor: Stephen Nicholas Bittner, Clifton, VA (US)

(73) Assignee: Convergys Customer Management Group, Inc., Cincinnati, OH (US)

( * ) Notice: Subject to any disclaimer, the term of this patent is extended or adjusted under 35 U.S.C. 154(b) by 1388 days.

(21) Appl. No.: 11/076,602

(22) Filed: Mar. 10, 2005

(65) Prior Publication Data

US 2005/0201526 A1    Sep. 15, 2005

Related U.S. Application Data

(60) Provisional application No. 60/551,954, filed on Mar. 10, 2004.

(51) Int. Cl.
H04M 1/64 (2006.01)
(52) U.S. Cl. .......................... 379/72; 379/88.18
(58) Field of Classification Search ............ 379/88.18, 379/72
See application file for complete search history.

(56) References Cited

U.S. PATENT DOCUMENTS

| | | | |
|---|---|---|---|
| 5,164,981 A | 11/1992 | Mitchell et al. | |
| 5,327,490 A | 7/1994 | Cave | |
| 5,493,608 A | 2/1996 | O'Sullivan | |
| 5,684,863 A | 11/1997 | Katz | |
| 5,822,401 A | 10/1998 | Cave et al. | |
| 6,052,441 A | 4/2000 | Sato | |
| 6,061,433 A | 5/2000 | Polcyn et al. | |
| 6,094,635 A | 7/2000 | Scholz et al. | |
| 6,332,154 B2 | 12/2001 | Beck et al. | |
| 6,370,437 B1 * | 4/2002 | Carter et al. | 700/52 |
| 6,373,939 B1 | 4/2002 | Reese et al. | |
| 6,411,687 B1 | 6/2002 | Bohacek et al. | |
| 6,446,261 B1 * | 9/2002 | Rosser | 725/34 |
| 6,487,277 B2 | 11/2002 | Beyda et al. | |
| 6,647,111 B1 | 11/2003 | Bjornberg et al. | |
| 2001/0014146 A1 | 8/2001 | Beyda et al. | |
| 2002/0006186 A1 | 1/2002 | Sanders | |
| 2002/0076008 A1 | 6/2002 | Neary | |
| 2003/0053615 A1 | 3/2003 | Anderson et al. | |
| 2003/0103608 A1 | 6/2003 | Pearson et al. | |
| 2003/0161449 A1 | 8/2003 | Plan | |
| 2004/0037401 A1 | 2/2004 | Dow et al. | |
| 2004/0047453 A1 | 3/2004 | Fraser | |

OTHER PUBLICATIONS

U.S. Appl. No. 11/565,702, filed Dec. 1, 2006.

(Continued)

Primary Examiner—Simon Sing
(74) Attorney, Agent, or Firm—William S. Morriss; Frost Brown Todd LLC

(57) ABSTRACT

An IVR signature detection and event management system facilitates real-time discovery and notification of abnormal behavior within an IVR system. The system collects metrics associated with usage of the IVR system. The system uses the collected metrics to define a baseline. Having defined a baseline, the system collects evaluation metrics for comparison to the baseline. Where the evaluation metrics deviate from the baseline beyond a threshold deviation, the system detects aberrance. The system triggers an event in response to the detected aberrance. The event may be a message, one or more corrective actions, or the like.

20 Claims, 2 Drawing Sheets

OTHER PUBLICATIONS

Application for U.S. Appl. No. 11/565,702, filed Dec. 1, 2006.
Information Disclosure Statement dated Sep. 26, 2007 for U.S. Appl. No. 11/565,702.

U.S. Appl. No. 60/957,555, filed Aug. 23, 2007.
Application for U.S. Appl. No. 60/957,555, filed Aug. 23, 2007.

* cited by examiner

SYSTEM AND METHOD FOR IVR SIGNATURE DETECTION AND EVENT MANAGEMENT

PRIORITY

This application claims priority benefit of the disclosure of U.S. Provisional Patent Application Ser. No. 60/551,954, entitled "System and Method for IVR Signature Detection and Event Management," filed Mar. 10, 2004, the disclosure of which is incorporated by reference herein.

BACKGROUND

Some conventional Interactive Voice Response (IVR) systems have provided statistics or other feedback regarding use of the IVR system, but no one prior to the inventor has created or used the invention described in the appended claims.

BRIEF DESCRIPTION OF THE DRAWINGS

While the specification concludes with claims that particularly point out and distinctly claim the invention, it is believed the present invention will be better understood from the following description taken in conjunction with the accompanying drawings, in which like reference numerals identify the same elements. The drawings and detailed description which follow are intended to be merely illustrative and are not intended to limit the scope of the invention as set forth in the appended claims.

DETAILED DESCRIPTION OF EMBODIMENTS OF THE INVENTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
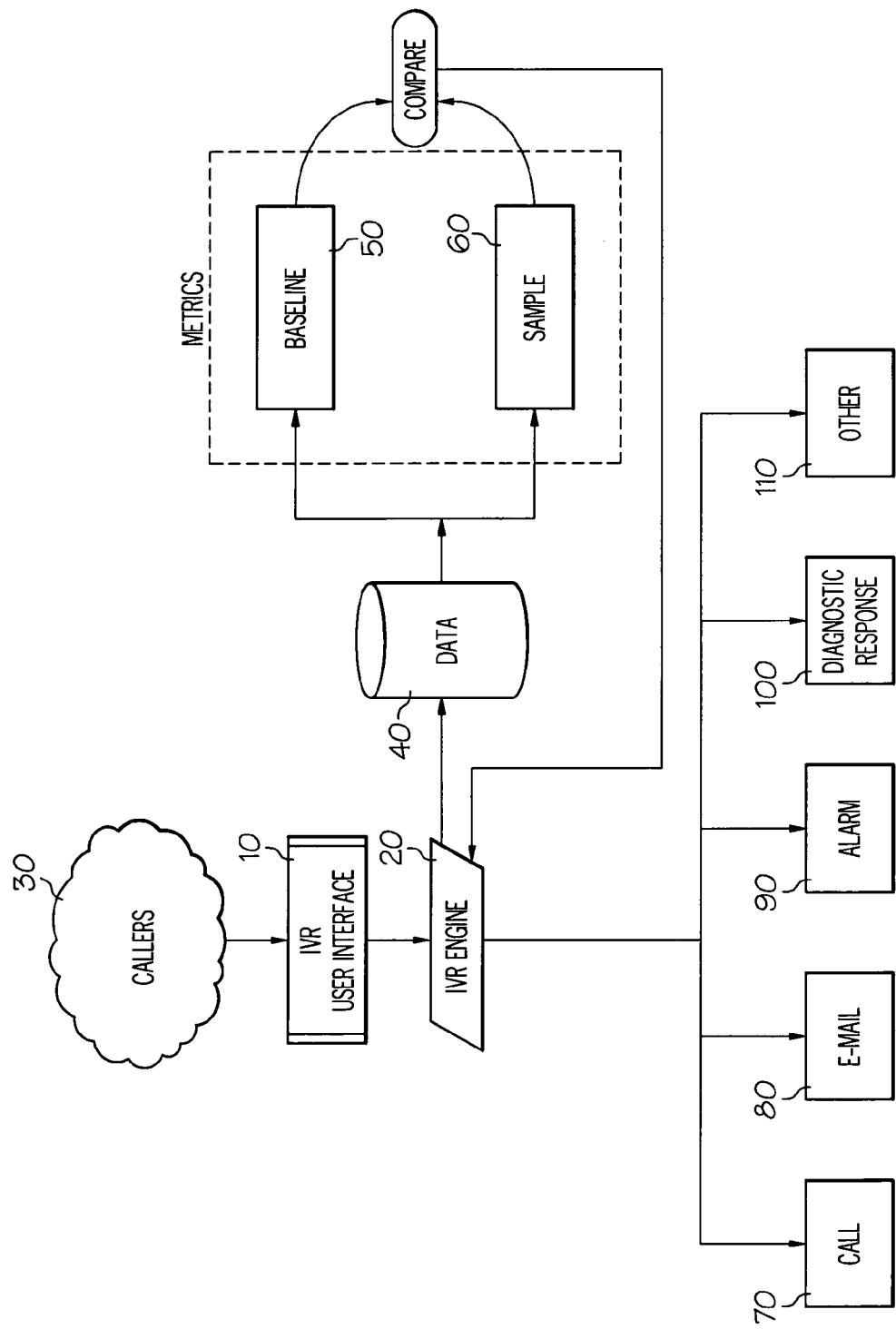
FIG. 1 depicts an exemplary system for monitoring IVR system usage.
Figure 2:
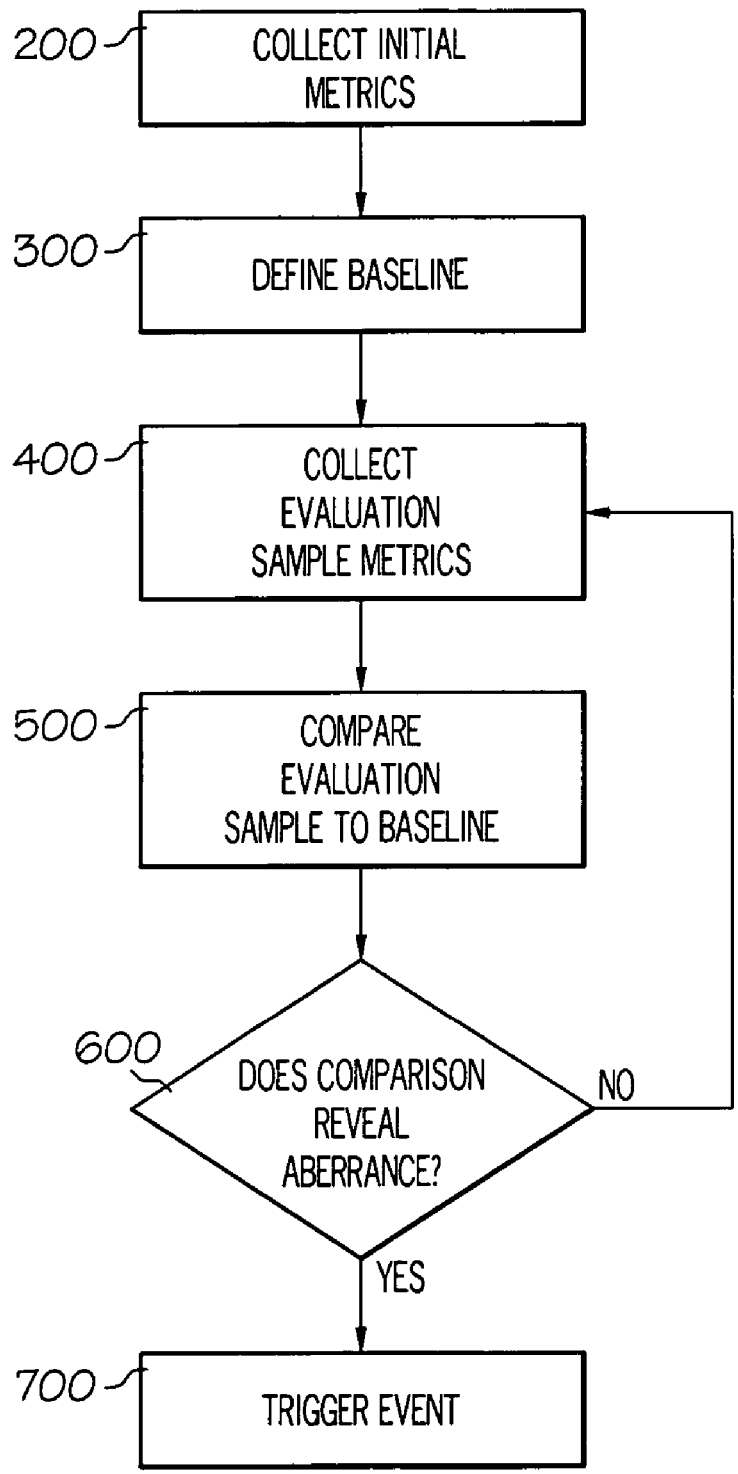
FIG. 2 depicts a block diagram showing an exemplary set of steps for monitoring IVR system usage.

The system of the present example provides monitoring of IVR system usage. This monitoring is accomplished, in part, through the collection and evaluation of metrics associated with IVR system usage. It will be appreciated that such monitoring may be provided in real-time, or in any other suitable fashion. It will also be appreciated that such monitoring may be provided within a traditional IVR application (e.g., keypad entry interface), a speech IVR application (e.g., speech recognition interface), combinations thereof, or any other IVR application. An exemplary system is illustrated in FIG. 1, which will be discussed in greater detail below. Monitoring steps performed by the system of the present example are depicted in FIG. 2, which will be described in further detail below.

As used herein, the term "metrics" should be read to include any aspects of IVR system usage that are capable of being measured or otherwise monitored automatically. The measured aspects may include discrete events (e.g., within a single call) or discrete usage characteristics, as well as patterns thereof. Metrics may be simple or complex. By way of example only, simple metrics may include call duration, average call duration per hour, average call duration per line, the number of times a given IVR application module is accessed during a given time, duration for which a given IVR application module is accessed, duration of a caller dwelling at a dialog, average dialog duration for each call, average duration of non-dialog interactions (e.g., business transactions, etc.), number of turns within a dialog, number of calls per a given amount of time (e.g., per hour, per day, per week, etc.), or call termination point. Other simple metrics will be apparent to those of ordinary skill in the art.

As used herein the term "turns per dialog" and its variants shall be read to include the number of prompt/response pairs required to successfully collect a single unit of information. For instance, where the IVR system prompts a caller to enter an account number, the caller enters the account number, the IVR system prompts the caller to confirm an account number, and the caller confirms the account number, then two turns are assigned to the collection of the account number. By contrast, if the caller dis-confirms the account number, is prompted to enter another account number, and enters another account number, then three turns are assigned to the collection.

By way of example only, a complex metric may comprise a call flow navigation sequence (e.g., the order of dialogs a caller executes within an IVR interaction or call). Other complex metrics will be apparent to those of ordinary skill in the art.

It will be appreciated that the system of the present example may be used to detect both simple and complex patterns of metrics within an IVR interaction or call. In one embodiment, metrics are collected or represented the form of an IVR signature. As used herein, the term "IVR signature" shall be read to include a distribution or pattern of metrics. For instance, an IVR signature may comprise a call flow navigation sequence, as well as any number of simple metrics associated with the respective call and/or IVR interaction(s). As another example, an IVR signature may comprise a statistical distribution of actual occurrences of all possible call flow navigation sequences, and may further include a statistical distribution of other metrics associated with the same calls. Other examples of IVR signatures will be apparent to those of ordinary skill in the art.

As shown in FIG. 1, which is intended to be merely illustrative and not limiting, a system operable to monitor IVR system usage may comprise an IVR user interface (10), which is in communication with an IVR engine (20), and may be accessed by a plurality of callers (30). The IVR engine (20) is operable to store call-related metrics and/or other data in a storage device (40), which may comprise any suitable medium. As will be discussed below, metrics are gathered to define or otherwise form a baseline (50). A sample (60) of metrics are compared to this baseline (50) to detect aberrance. In response to the detection of aberrance, the engine (20) may trigger an event, such as, by way of example only, a call (70) or e-mail (80) to systems maintenance personnel or other personnel, an alarm (90) to one or more persons or system component, a diagnostic response (100), or any other (110) event. Other suitable system components, configurations, operations, and features will be apparent to those of ordinary skill in the art.

An exemplary method that may be performed by the system of the present example is illustrated in FIG. 2. As shown, metrics-related data is collected by the system (200) until a statistically viable sample is achieved. In one embodiment, a statistically viable sample comprises 10,000 calls. Of course, any other suitable number of calls may be used. With respect to the number of calls, points at which a sample of metrics-related data may become "statistically viable" will be apparent to those of ordinary skill in the art. In any event, this sample is used to define a baseline sample (300). In one embodiment, the baseline (50) is in the form of a statistical spread or distribution. In another embodiment, a baseline (50) is based in part on captured metrics, and further includes other data entered by a user, system, or the like. Other suitable forms or features of a baseline (50), including but not limited to data or information beyond that present in captured metrics, will be apparent to those of ordinary skill in the art.

It will also be appreciated that a plurality of baselines (50) may be defined. By way of example only, where a plurality of baselines (50) are used, each baseline (50) may comprise a distinct metric, a distinct group of metrics, or a distinct pattern, relative to the other baselines (50) of the plurality. Alternatively, each baseline (50) of a plurality may differ based on a certain time associated with each baseline (50) (e.g., a baseline (50) for each day of the week, different baselines (50) for different calling periods within a day, etc.). Still other ways in which a plurality of baselines (50) may differ from each other will be apparent to those of ordinary skill in the art.

In addition, a baseline (50) may be updated. For instance, the system may update the baseline (50) at pre-selected or periodic intervals. Alternatively, the baseline (50) may be updated after a change to the IVR system architecture (e.g., device added, prompts added or re-ordered, etc.). Other suitable times at which the baseline (50) may be updated will be apparent to those of ordinary skill in the art.

With at least one baseline (50) having been defined, and referring back to FIG. 2, the system of the present example proceeds to collect additional metrics relating to use of the IVR system (evaluation sample metrics) (400). Such evaluation sample metrics are grouped (evaluation sample (60)) in a manner similar to the grouping of metrics that was used define a corresponding baseline (50). In other words, the evaluation sample (60) will include metrics that are also present in the corresponding baseline (50). For instance, if the baseline (50) is defined by a distribution of call termination points for a first set of calls, the evaluation sample (60) may be defined by a distribution of call termination points for a second set of calls. However, it will be appreciated that the evaluation sample (60) need not comprise or otherwise relate to the same number of calls as the baseline (50). By way of example only, a baseline (50) may comprise a distribution of metrics associated with 10,000 calls, while an evaluation sample (60) may comprise a distribution of metrics associated with 1,000 calls. Alternatively, an evaluation sample (60) may comprise one or more metrics associated with a single call, or any other number of calls. Other ways in which an evaluation sample (60) may be defined will be apparent to those of ordinary skill in the art.

In the present example, each evaluation sample (60) is compared (500) to the associated baseline (50). The system detects aberrant behavior (600) when this comparison reveals that an evaluation sample (60) exceeds a threshold deviation from the baseline (50). Such a deviation may show an increase or decrease in metrics (e.g., increase or decrease in average call duration). Suitable deviation thresholds will be apparent to those of ordinary skill in the art.

In one embodiment, the deviation threshold is set "manually." In this embodiment, data related to the baseline (e.g. statistical data, metrics values, etc.) are inspected, and a suitable deviation threshold is determined based on this inspection. Such inspection and/or determination may be carried out by any person or process, and may be based on any suitable criteria. Other variations of manually setting a deviation threshold will be apparent to those of ordinary skill in the art.

In another embodiment, the deviation threshold is set "automatically." In this embodiment, the deviation threshold is automatically based on a variance or other statistical feature of the metric data. For instance, where a statistical distribution associated with a baseline sample has a certain variance, standard deviation, or other statistical feature, the deviation threshold may be automatically based on this variance, standard deviation, or other statistical feature. In other words, the deviation threshold may be a function of one or more statistical features of baseline sample data or other data. Still other ways of automatically setting a deviation threshold will be apparent to those of ordinary skill in the art.

It will also be appreciated that a plurality of deviation thresholds may be used. Where a plurality of deviation thresholds are defined, the determination of which particular threshold to use in a particular context may be a function of time (e.g. time of day, day of week, etc.), a particular metric being monitored, and/or any other factor. In addition, it will be appreciated that a combination of manually set and automatically set deviation thresholds may be used. In any event, deviation thresholds may serve a purpose of distinguishing between aberrance and non-aberrance, such that deviations beyond the threshold indicate aberrance, while deviations within the threshold are considered not aberrant.

When aberrant behavior is detected, the system may trigger an event (700). If no aberrant behavior is detected (i.e., deviation is within threshold), the system may collect additional, subsequent evaluation samples (400) for comparison (500) to the associated baseline (50). This process may be iterated any suitable number of times and at any suitable intervals.

In one example, a system monitors call flow navigation sequences relating to usage of an IVR system. Over time, a finite number of call flow navigation sequences emerges, along with a relative percentage relating to the occurrence of each those sequences. This distribution of sequences is defined as the baseline (50) IVR navigation signature. As callers (30) continue to navigate the IVR application, subsequent IVR navigation sequences are captured over fixed time periods. At the end of each of the fixed time periods, the resulting subsequent IVR navigation sequences are used to define an evaluation sample (60) IVR navigation signature. This evaluation sample (60) IVR navigation signature is then compared to the baseline (50) IVR navigation signature. If the evaluation sample (60) IVR navigation signature deviates from the baseline (50) IVR navigation signature beyond a pre-defined threshold, in any aspect or in any direction, then an event may be triggered.

It will be appreciated that the monitoring of IVR system usage may be passive or active, including combinations and variations thereof. Whether monitoring is "passive" or "active" may depend, at least in part, on the event(s) that is/are triggered in response to the detection of aberrant behavior.

By way of example only, with passive monitoring, the system may simply report aberrant behavior discovered during use of the IVR system, without taking any corrective action. For instance, the discovery and identification of aberrant behavior may trigger an event such as a message to a systems analyst or maintenance personnel. Such a message may comprise any useful information, including but not limited to notification of the presence of the aberrance, the primary source of the aberrance, or a suggested way to correct or otherwise account for the aberrance. In addition, a message may reflect a priority level of the aberrance (e.g., the aberrance comprises a high or low priority issue). The message may be delivered in any suitable form and/or medium. By way of example only, the message may be delivered by a call (70), an e-mail (90), or otherwise. Still other features for a message, including but not limited to content, delivery method(s), medium/media, and recipient(s), will be apparent to those of ordinary skill in the art.

It will be appreciated that, where a system uses passive monitoring comprising sending a message to a systems analyst, the systems analyst may make adjustments to the IVR system to account for the reported aberrance. For instance, where a relatively large number of call flow navigation sequences include requests for a foreign language, the analyst may effect fine-tuning of the IVR system, such as by re-ordering dialogs or by re-wording prompts.

In another embodiment, a passive monitoring triggered event comprises an emergency alarm (90) to systems maintenance personnel in the event of abnormal call flow navigation, system capacity issues (e.g., system use closely approaching or exceeding system capacity), or breakages within the call flow causing high rates of abandonment. Systems maintenance personnel may then take appropriate action.

In yet another embodiment, a passive monitoring event comprises an alarm (90) to a component of the system. Such an alarm (90) may comprise some form of notice and/or may simply comprise logging the aberrance. Other suitable alarm (90) features will be apparent to those of ordinary skill in the art.

Still other forms of passive monitoring will be apparent to those of ordinary skill in the art.

With active monitoring, the system may provide real-time, automated system responses to aberrant behavior discovered during use of the IVR system. Such a response may comprise corrective action to respond to the detected aberrance. By way of example only, an active monitoring triggered event may comprise an automated diagnostic and response function (100), such as within the IVR platform. Such response functions may comprise an automated transfer function, a personalization in call flow, Computer Telephony Integration (CTI) switching, or other active change in call flow, by way of example only. Of course, such active monitoring functions may be coupled with messages such as those employed in passive monitoring.

In another embodiment of active monitoring, the triggered event comprises a message to the caller (30) providing additional options or instructions. For instance, the system may provide the caller (30) with optional transfer functions for additional call paths, which may be offered based on certain navigation sequences or other criteria.

Other events (110) that could be triggered upon the discovery and identification of aberrant behavior, including but not limited to those triggered during passive or active monitoring, will be apparent to those of ordinary skill in the art.

It will be appreciated that certain deviations from a baseline (50) may be regarded as "positive," "negative," or "neutral" events. For instance, where a deviation from a baseline (50) reveals that the IVR system is performing more smoothly than before (i.e., more smoothly than when the baseline (50) data was captured), such a change may be regarded as "positive." By contrast, where a deviation from the baseline (50) reveals that the IVR system is not performing as smoothly as it performed when the baseline (50) data was captured, then such a change may be regarded as "negative." Other deviations may not speak to whether the IVR system is performing well (e.g., deviation showing an abnormally high call volume), and may therefore be regarded as "neutral." Accordingly, certain metrics, or changes in metrics, may be associated with a positive, neutral, or negative indicator. While the foregoing examples suggest the use of such indicators to reflect trends or changes in IVR system performance or usage, it will be appreciated that the indicators may reflect other trends, changes, or data.

In addition, where indicators are used in conjunction with reporting as an event triggered by detection of aberrance, the indicators may be reflected in the report in the form of priority indicators. By way of example only, negative indicators may be associated with a "high priority" indicator, while positive indicators may be associated with a "low priority" indicator. For instance, where a detected aberrance is associated with a negative indicator, the aberrance may be reported as a "high priority." Similarly, where a detected aberrance is associated with a positive indicator, the aberrance may be reported as a "low priority." Neutral indicators may also be associated with a "low priority" indicator, or any other priority indicator, if any at all. Still other suitable uses of indicators will be apparent to those of ordinary skill in the art.

In one embodiment, the following metrics are associated with a neutral indicator: call volume per day of week; call volume per hour per day per week; call duration per day of week; call duration per hour per day of week; and call duration per hour per day per week. Accordingly, regardless of whether the deviation of these metrics from the baseline (50) is an increase or decrease, the deviation event is regarded as neutral. Other metrics or changes in metrics that may be associated with a neutral indicator will be apparent to those of ordinary skill in the art.

In another embodiment, a significant change (i.e. beyond threshold deviation) in the metric of elapsed transaction time may be associated with a positive or negative indicator when the change is a decrease or increase in the elapsed time, respectively. In yet another embodiment, an IVR system comprises a recognizer configured to return a confidence score associated with the collection of information from a caller (30) (e.g., confidence score associated with the entry of an account number by a caller (30)). In this embodiment, there exists the metric of recognizer confidence, which may be associated with a positive or negative indicator when the change is an increase or decrease in recognizer confidence, respectively. Of course, a variety of other metrics and/or changes in metrics may be associated with a positive or negative indicator, and the foregoing examples are merely illustrative and not intended to be limiting in any way.

It will also be appreciated that indicators may be generic or custom. A "generic indicator" may be used across a variety of applications for a variety of businesses. Such generic indicators may include, by way of example only, call volume, transaction execution times, or number of turns per dialog. By contrast, a "custom indicator" is tailored to or selected by a particular entity or industry, or is otherwise only applicable to a limited number of applications. For instance, where an entity who uses the IVR system is interested in the number of the entity's customers' called-in complaints, a custom indicator may be associated with the selection of "customer complaint" off of an IVR voice menu. The entity may associate an increase in the selection of the "customer complaint" option with a negative indicator, such that the system will provide a high priority alarm when the number of times callers (30) choose the "customer complaint" option increases to the point of aberrance (i.e., beyond threshold deviation). Other generic and custom indicators, including methods of using the same, will be apparent to those of ordinary skill in the art.

In another embodiment, a system comprises IVR data capture and IVR data analysis components (or a combination thereof). Data points are designated through a graphical user interface. Such data points may comprise one or more thresholds. Thereafter, data captured by the system is filed to a database (e.g., an online transaction processing database). From the database, an interface may feed data into a knowledge management system which acts as a repository for the statistical information. Real-time analysis may be performed on this data to trigger events which may ultimately affect the call processing flow.

In another embodiment, an IVR detection and event management system is used to personalize the customer experience and provide differentiated treatment based on each customer's unique signature and call flow navigation on a real-time basis. For instance, the system may have the ability to track individual customer states and store those over time. Consequently, frequent callers (30) or multiple repeat callers (30) within a designated timeframe could be handled differently and given personalized options for call handling.

The following examples 1A, 1B, 2A, and 2C demonstrate how embodiments of the system and method described herein may be implemented with passive monitoring:

EXAMPLE 1A

An IVR system in the context of a self-service speech recognition application is employed on behalf of a financial institution. 10,000 calls have been initiated by a demographically dispersed set of retail customers. A relative distribution of these calls yields the following percentages of call termination points within the application: 25% of callers opt out to a live agent; 30% of callers successfully complete balance inquiry; 25% of callers successfully complete funds transfer; 10% of callers successfully retrieve branch location; 10% of callers hang-up prior to successful transaction completion. A baseline is defined based on this distribution. The metric of call termination point is associated with positive and negative indicators. A positive indicator represents a positive trend in the application, such as higher automation rates. A negative indicator represents a negative trend in the application, such as a higher opt out to a live agent or a higher percentage of hang-ups.

Next, call termination points for a subsequent set of 1,000 call samples are captured. A sample distribution is measured to calculate the relative percentage of the call termination points of the 1,000 call samples. A comparison of the sample distribution to the baseline reveals that the opt out to live agent percentage has increased a statistically significant amount (i.e., exceeds a threshold deviation). An alarm is raised based on the detection of this aberrance. Because the statistical change is an increase in callers opting out to a live agent (a negative indicator), the alarm is raised as a high priority issue. Pursuant to the alarm, a project manager or network operations center personnel is/are paged with an indication of the client (i.e., the financial institution), the application, and the type of aberrance. The issue is investigated and corrective action is taken.

EXAMPLE 1B

In a variation of example 1A, a comparison of the sample distribution to the baseline reveals that the opt out to live agent percentage has decreased a statistically significant amount (i.e., exceeds a threshold deviation). An alarm is raised based on the detection of this aberrance. Because the statistical change is a decrease in callers opting out to a live agent (a positive indicator), the alarm is raised as a low priority issue. Pursuant to the alarm, a project manager or network operations center personnel is/are paged with an indication of the client (i.e., the financial institution), the application, and the type of aberrance. The issue is investigated to determine the cause of the positive change in the application.

EXAMPLE 2A

An IVR system in the context of a self-service speech recognition application is employed on behalf of a financial institution. 1,000 calls are initiated from a demographically dispersed set of retail customers. The number of turns per dialog for these calls is collected. The collected turns per dialog are used to define a baseline comprising a statistical spread having a known variance. Changes in turns per dialog are associated with positive or negative indicators. A positive indicator represents a positive trend in the application, such as fewer turns per dialog. A negative indicator represents a negative trend in the application, such as a higher number of turns per dialog.

Next, the average turns per dialog for a subsequent set of 500 call samples are captured. A comparison of the sampled average turns per dialog to the baseline reveals that the average number of turns for the money collection dialog has increased from 1.2 to 2.2. An alarm is raised based on the detection of this aberrance. Because the statistical change is an increase in turns per dialog (a negative indicator), the alarm is raised as a high priority issue. Pursuant to the alarm, a project manager or network operations center personnel is/are paged with an indication of the client (i.e., the financial institution), the application, and the type of aberrance. The issue is investigated and corrective action is taken.

EXAMPLE 2B

In a variation of example 2A, a comparison of the sampled average to the baseline reveals that the average number of turns for the money collection dialog has decreased from 1.8 to 1.2. An alarm is raised based on the detection of this aberrance. Because the statistical change is a decrease in turns per dialog (a positive indicator), the alarm is raised as a low priority issue. Pursuant to the alarm, a project manager or network operations center personnel is/are paged with an indication of the client (i.e., the financial institution), the application, and the type of aberrance. The issue is investigated to determine the cause of the positive change in the application.

Of course, the foregoing examples are merely illustrative, and are not intended to be limiting in any way.

Having shown and described various embodiments and concepts of the invention, further adaptations of the methods and systems described herein can be accomplished by appropriate modifications by one of ordinary skill in the art without departing from the scope of the invention. Several of such potential alternatives, modifications, and variations have been mentioned, and others will be apparent to those skilled in the art in light of the foregoing teachings. Accordingly, the invention is intended to embrace all such alternatives, modifications and variations as may fall within the spirit and scope of the appended claims and is understood not to be limited to the details of structure and operation shown and described in the specification and drawings.

What is claimed is:

1. A method of providing IVR system monitoring, the method comprising:
   (a) capturing a first set of metrics associated with use of an IVR system by a plurality of callers, the metrics of the first set comprising at least one of:
      (i) call flow navigation sequence,
      (ii) call termination point, or (iii) number turns per dialog;
(b) defining a baseline sample based on the captured first set of metrics;
(c) capturing a second set of metrics associated with use of the IVR system by a plurality of callers, the metrics of the second set comprising at least one of:
  (i) call flow navigation sequence,
  (ii) call termination point, or
  (iii) number turns per dialog;
(d) defining a comparison sample based on the second set of metrics;
(e) comparing the comparison sample to the baseline sample; and
(f) triggering an event when the step of comparing the comparison sample to the baseline sample reveals aberrance.

2. The method of claim 1, wherein the baseline sample comprises a baseline IVR signature.

3. The method of claim 1, wherein the step of comparing the comparison sample to the baseline sample comprises determining a deviation of the comparison sample from the baseline sample.

4. The method of claim 3, wherein the step of comparing the comparison sample to the baseline sample further comprises determining whether the deviation exceeds a threshold deviation.

5. The method of claim 1, wherein the step of triggering an event comprises sending a message including notice of the aberrance.

6. The method of claim 5, wherein the notice includes a priority indicator.

7. The method of claim 1, wherein the step of triggering an event comprises performing an automated diagnostic function.

8. The method of claim 1, wherein the step of triggering an event comprises sending a message to at least one of a systems analyst or systems maintenance personnel.

9. The method of claim 1, wherein the step of triggering an event comprises sending a message to a caller, the message comprising at least one of additional options or instructions.

10. The method of claim 1, wherein the baseline sample comprises a statistical distribution of a first set of call flow navigation sequences.

11. The method of claim 10, wherein the comparison sample comprises a statistical distribution of a second set of call flow navigation sequences.

12. The method of claim 1, further comprising updating the baseline sample.

13. The method of claim 1, wherein the step of capturing a second set of metrics is performed subsequent to the step of capturing a first set of metrics.

14. The method of claim 1, further comprising defining a plurality of baseline samples, wherein each baseline sample of the plurality of baseline samples corresponds to a type of comparison sample.

15. The method of claim 14, wherein each baseline sample of the plurality of baseline samples relates to at least one metric that is not related to the other baselines of the plurality of baseline samples.

16. A computer readable medium comprising instructions to perform the steps of the method of claim 1.

17. A method of providing real-time IVR system monitoring comprising:
  (a) capturing metrics associated with use of an IVR system by a plurality of users, said metrics comprising a first set of call flow navigation sequences;
  (b) defining a baseline sample based on the first set of call flow navigation sequences;
  (c) capturing subsequent metrics associated with use of the IVR system by a plurality of users subsequent to the step of defining a baseline sample, wherein the subsequent metrics comprise a second set of call flow navigation sequences;
  (d) defining a comparison sample based on the second set of call flow navigation sequences;
  (e) comparing the comparison sample to the baseline sample; and
  (f) triggering an event in real time when the step of comparing the comparison sample to the baseline sample reveals aberrance.

18. The method of claim 17, wherein the baseline sample comprises a statistical distribution based on the first set of call flow navigation sequences.

19. The method of claim 18, wherein the comparison sample comprises a statistical distribution based on the second set of call flow navigation sequences.

20. A method of providing IVR system monitoring comprising:
  (a) capturing a plurality of metrics associated with use of an IVR system by a plurality of users, the metrics including at least one of:
    (i) call flow navigation sequence,
    (ii) call termination point, or
    (iii) number turns per dialog;
  (b) defining a baseline based at least in part on the captured plurality of metrics
  (c) defining a sample based at least in part on the captured plurality of metrics
  (d) comparing the sample to the baseline; and
  (e) triggering an event when the act of comparing reveals aberrance.

* * * * *